UNITED STATES PATENT OFFICE.

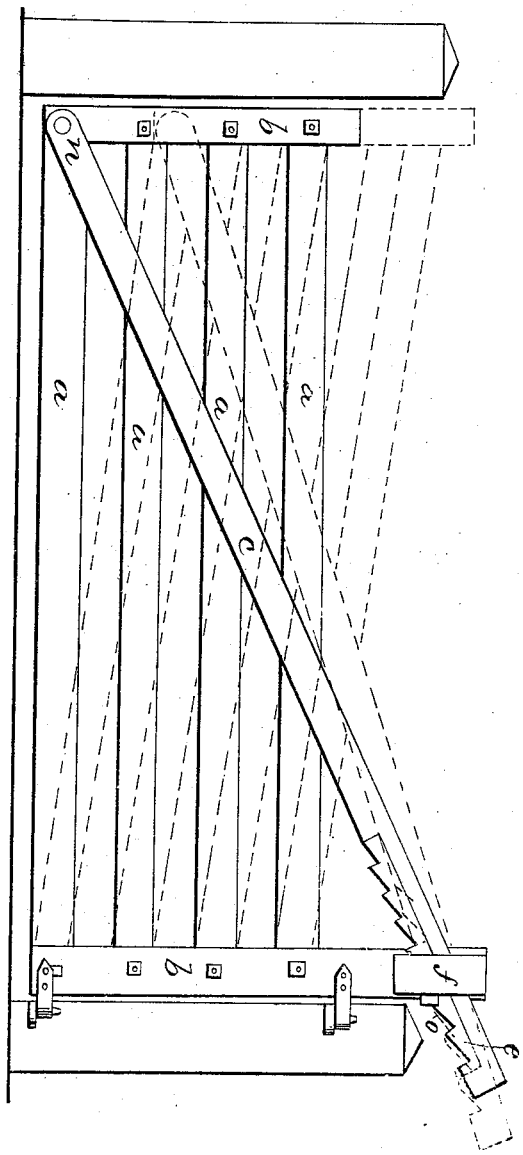

ROBERT R. EARNEST, OF SPRINGFIELD, OHIO.

IMPROVEMENT IN GATES.

Specification forming part of Letters Patent No. 55,259, dated June 5, 1866.

*To all whom it may concern:*

Be it known that I, ROBERT R. EARNEST, of Springfield, in the county of Clarke and State of Ohio, have invented certain new and useful Improvements in Farm-Gates; and I do hereby declare that the following is a full, clear, and exact description thereof, reference being had to the accompanying drawing, making part of this specification, and to the letters of reference marked thereon, like letters indicating like parts wherever they occur.

To enable others skilled in the art to construct and use the invention, I will proceed to describe it.

My invention consists in having the horizontal bars of the gate pivoted to the posts at each end, and having a brace provided with notches at its upper end, so arranged that the front end of the gate may be elevated and held at any required height.

In ordinary gates it is found by experience that great difficulty ensues from the sagging of the gate or the settling and tipping of the posts, thereby causing the front end to drag on the ground and rendering it difficult to open or close them, and this difficulty is greatly enhanced in the winter by snow-drifts and similar obstructions. To remedy these difficulties I construct the gate of horizontal bars $a$, pivoted at each end to the posts or vertical bars $b$, as shown in the drawing. I then pivot a brace, $c$, at $n$, as shown, and have its upper end project through a guide or loop, $f$, secured to the top of the rear bar, $b$. A metal plate, $e$, having notches cut on its lower edge, is secured to the brace $c$ at its upper end, where it passes through the loop or cap $f$, said notches catching over a block or pin, $o$, secured to the loop $f$, or to the top of the post $b$, as shown.

When it is desired to raise the front end of the gate for any purpose, it is only necessary to lift it up to the desired height, when the notches of the plate $e$ on the brace $c$ will engage with the block $o$ and hold it there. By this means the settling of the gate from any cause whatever can be at any time remedied, and in winter the gate can be so elevated as to swing over snow-drifts or similar obstructions. It is also useful in separating stock—as, for instance, cattle from sheep or swine—as by raising the gate and leaving it closed the smaller animals can pass under, while the larger ones will be retained.

Having thus described my invention, what I claim is—

A gate having its horizontal bars pivoted at each end, as shown, in combination with the brace $c$, pivoted at its lower front end, and having it notched and arranged to operate in connection with the loop $f$ and block $o$, as set forth.

ROBERT R. EARNEST.

Witnesses:
J. KREIDER MOWER,
GEO. MOWER.